June 17, 1969 R. J. OLSON ET AL 3,450,632
METHOD FOR SIMULTANEOUSLY COALESCING, FILTERING
AND REMOVING OIL TRACES FROM LIQUIDS AND
MEDIA FOR ACCOMPLISHING THE SAME
Filed May 3, 1967
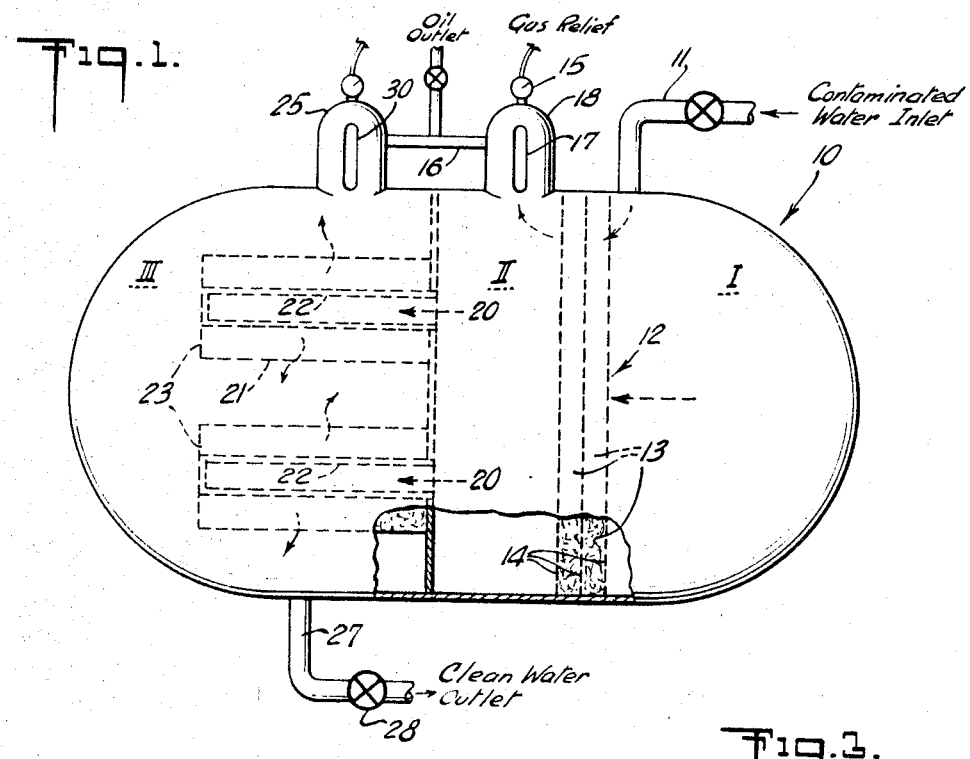
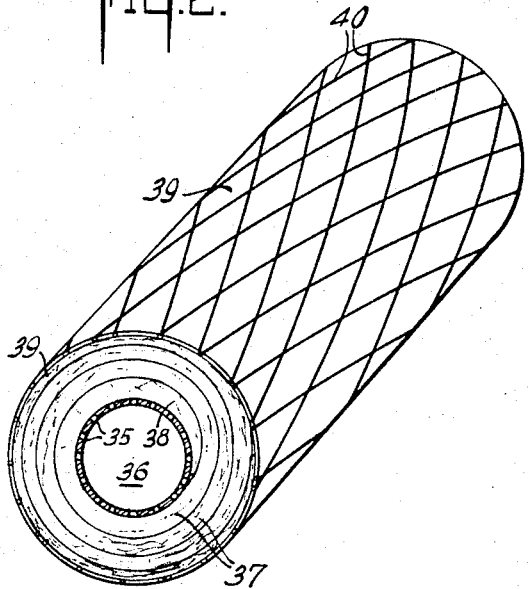
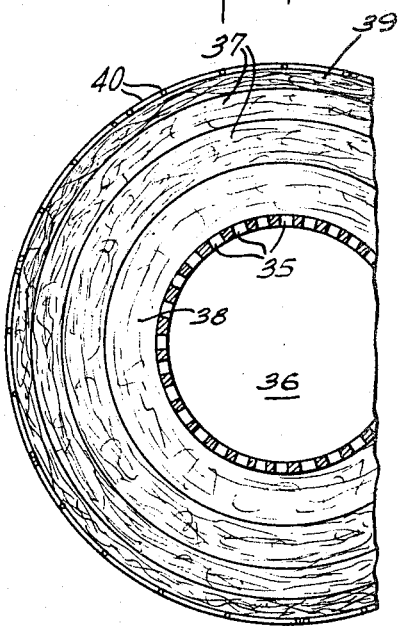
INVENTORS
ROBERT JAMES OLSON
GEORGE L. ELLIS
MALCOLM HUVAL
BY
ATTORNEY

United States Patent Office 3,450,632
Patented June 17, 1969

3,450,632
METHOD FOR SIMULTANEOUSLY COALESCING, FILTERING AND REMOVING OIL TRACES FROM LIQUIDS AND MEDIA FOR ACCOMPLISHING THE SAME
Robert James Olson, East Brunswick, N.J., George L. Ellis, Houston, Tex., and Malcolm Huval, Lafayette, La.; said Malcolm Huval, assignor to Chevron Research Company, San Francisco, Calif., a corporation of Delaware, and said Robert J. Olson and George L. Ellis, assignors to Johnson & Johnson, a corporation of New Jersey
Filed May 3, 1967, Ser. No. 635,863
Int. Cl. B01d 39/14, 13/00
U.S. Cl. 210—23
19 Claims

ABSTRACT OF THE DISCLOSURE

A method and device for removing traces of oil from liquids which are immiscible by passing the liquid containing the traces of oil through a media preferably of graded density comprising a batt of specific types of fibers such as polyester, acrylic and modacrylic bonded with specific resins such as polyacrylic, polyurethane resins and synthetic rubber to provide resilience and solids capacity and passing the oil-liquid mixture through said batt at specific velocities to simultaneously remove solid particles from the liquid and coalesce the oil so that it may be separated from the liquid.

---

This invention relates to a method for removing traces of oil from liquids with which the oil is immiscible and to improved media for accomplishing such separation, more particularly, this invention relates to removing traces of oil from water by passing it through improved media at specific velocities to remove solid particles and coalesce oil so that it may be removed and recovered.

Many immiscible liquids, such as oil and water, may be readily separated merely by allowing the mixture to stand, the lighter component will rise and is removed from the top of the mixture. The remaining water has a small quantity of oil left which in many instances is not economical to remove unless it is desired to purify the water. With the advent of off-shore drilling these trace amounts of oil in the water layer have caused many problems. In the oil production operation the well produces a mixture of oil, water, gas and sand or dirt. By allowing this mixture to settle it may be separated into four layers with the gas at the very top which is recovered, a layer of oil, a layer of water and at the very bottom sand or dirt. The water layer contains some oil along with some suspended solid particles. If this layer is passed through a heating mechanism the amount of oil in the layer may be reduced to 150 to 500 parts per million resulting in further recovery of oil. The amount of oil now has been reduced to traces by this technique. When this water is dumped into the open water a slick is formed which pollutes the water and this valuable oil is lost.

We have discovered a coalescing and filtering media and a method of coalescing and filtering liquid layers containing trace of amounts of oil or similar hydrocarbon materials both to remove and recover the oil in an economical manner and to purify the water so that it may be placed anyplace without fear of pollution.

In our technique the amount of oil in the liquid may be reduced to as low as 2 to 3 parts per million and to no more than about 10 to 15 parts per million.

In accordance with the present invention traces of oil are removed from liquids with which they are immiscible by passing the mixture of oil, liquid and solids through a media comprising a batt of fibers selected from the class consisting of polyester fibers, acrylic fibers, modacrylic fibers and mixtures of these fibers. The batt is bonded with a binder selected from the class comprising polyacrylate resins, polyurethane resins and synthetic rubbers. The amount of resin in the batt is from about 25 to 100 percent by weight of the fibers. The resin is uniformly distributed throughout the batt of fibers, whereby the batt has good resilience. The downstream side of the batt has a density of from about 0.05 to 0.08 gram per cubic centimeter and the upstream side of the batt has a density of from about 0.05 to 0.02 gram per cubic centimeter. The liquid from which the oil is to be removed is passed through the batt at a velocity of from about 0.1 to 0.35 feet per minute. Solid particles in the liquid are removed by the media and the oil, as it is passed through the media, is caused to coalesce and form larger drops of oil which collect on the innumerable surfaces of the fibers and when large enough break the surface tension forces, release from the fibers and rise to the top of the liquid layer for removal.

If the liquid from which the oil which is to be removed contains sufficient solid particles it may be desirable to pass the mixture through a pre-filter to remove solid particles and extend the life of the final media and initiate the coalescing action of the oil. It is preferred that the pre-filter be made from the same fibers and resins as are used in the final media.

It has been discovered that it is preferred that the filter media be wrapped about a perforated cylinder open at one end and closed at the other end. This wrapping about the perforated cylinder allows for a graduated density from the layer next to the cylinder surface to the outer layer merely by the tightness of wrapping the media about the cylinder. It is also believed that this technique provides a more rigid type filter not tending to be compressed or washed away by the large amounts of liquid being passed through the filter even under high pressures. In operation, the liquid is fed to the open end of the cylinder and allowed to pass outwardly through the media. As the oil liquid mixture is passed through the media the small oil particles are attracted to the media. These small oil particles within the media adhere thereto until joined by other small oil particles and form larger particles until they form a large enough oil particle with sufficient force to break the surface tension of the water. The large oil particle being lighter than water rises to the top. Oil held by solid particles in the liquid being treated, are also caught by the media and the free oil on the media attracts the oil from these solid particles and also forms larger particles which rise.

The invention will be more fully described in the following detailed description taken in conjunction with the accompanying drawings, wherein, FIGURE 1 is a sectional view of the separator tank for carrying out the methods of the present invention along with the improved coalescing device of the present invention.

FIGURE 2 is a view in perspective of an improved filter and coalescing cartridge of the present invention, and FIGURE 3 is a cross-sectional view of such an improved filter and coalescing cartridge as shown in FIGURE 2.

Referring to the drawings, in FIGURE 1 there is shown a separator tank 10. To the front section I of the tank there is an inlet 11 through which the mixture to be purified is fed. This mixture, under pressure, passes through the primary filter 12, which comprises a number of layers 13 of suitable filter media preferably media made from polyester, acrylic or modacrylic fibers. The primary filter supported and held in place either by perforated or expanded metal, open wire mesh, open woven fabric or similar material 18. A suitable pre-filter comprises 4 or more layers of media of polyester fibers bonded with a polyacrylic resin. Interspersed between layers to support the layers and aid the filtration are layers of open woven fabric made from polypropylene monofilament yarns. The primary filter removes the larger solid particles and also initiates the coalescing action of oil. If gas is present in the mixture, the primary filter will break out the gas and allow it to be separated at the vapor release valve 15 in section II. A separate connection 16 is contained in this section for removal of coalesced oil. A visual level 17, either automatic or manual, is carried in the dome 18 to control the gas and oil take-off. The liquid passes into the center opening 20 of the cartridges 21. Though two cartridges are shown, one or virtually any number may be used, depending upon the amount of material being treated and the area desired for treatment. The cartridge comprises an inner core 22 of expanded metal with the media 23 wrapped about the core. The mixture to be filtered passes through the center opening of the cartridge out through the perforations in the core and out through the media into section III. The oil coalesced by the media rises to the accumulation dome 25 and the water is removed through the outlet opening 26 in the bottom of the system by the valve 28. The accumulation dome also has a visual level 30 for determining and controlling the amount of material to be drained off.

Enlarged views of the filter cartridges are shown in FIGURES 2 and 3. The cylinder is made of perforated metal 35 or other suitable porous material which is reasonably rigid. The open end 36 of the cylinder fits into the plate in the separator tank with the opposite end closed as shown in FIGURE 1. Layers of media 37 are wrapped about the cylinder at increasing degrees of compression so that the density next to the surface of the cylinder 38 is less than the density of the very outer surface 39, a number of layers may be used provided that the downstream density is within the limits previously described and the upstream density is also within the limits previously described and the density is graduated from the downstream to the upstream side. The media is then covered with wire mesh 40 or expanded metal or open plastic material to maintain it in a substantially uniform construction and to aid in handling.

The fibers used in making the media must meet two criteria. First, they must have an affinity for oil and second, they must have a resilience which is capable of being maintained in batt form by applying binder material to the batt. This first property is required so that the small droplets of oil cling to the fibers until they grow in size sufficient to break the surface tension force of the water and the large oil particle allowed to rise. The second property is required so that the filter maintains the desired density and is efficient over a sufficient time to make the filter economical. Without this resilience or without the binder, the large amounts of liquid and the pressures used in obtaining coalescence cause the fibers to mat or ball-up and be compressed thus reducing the density and blocking the filter. The suitable fibers may be selected from the class comprising the polyester fibers, acrylic fibers, modacrylic fibers and mixtures of these fibers.

Fiber denier is also important in order to produce a filter which will coalesce oil, remove solid particles, has resilience and does not block. Deniers of from 1 to 50 denier have been found suitable.

In binding the fibers together it is preferred that they be uniformly impregnated with a suitable binder which also has an affinity for oil, is not degraded by the oil-water mixture and which maintains or produces a resilient batt. As the binder coats a portion of the surface of the fiber thus reducing the available sites for the oil it is important that the binder have substantially equal or greater affinity for the oil than the fiber. Binders which have been found suitable may be selected from the class consisting of the polyacrylic resins, polyurethane resins and the synthetic rubbers. Examples of such binders are the self-cross-linking polymers of acrylic acid, ethyl acrylate, etc., the acrylonitrile-butadiene polymers, and the butadiene-styrene polymers.

The amount of binder used may vary from about 25 to 100 percent of the weight of the fibers.

As previously noted it is important that there be a density variation across the filter in order to remove substantially all of the oil by coalescence. The density in the upstream side of the filter may vary from about 0.005 g./cc. to 0.02 gram per cubic centimeter and preferably from about .008 to 0.015 gram per cubic centimeter. Lower densities than this will allow too great a free path for the oil and hence, will not coalesce; higher densities than this will coalesce oil in this area and as the oil moves through the filter, may tend to break up or redisperse and also the filter will block after short periods of operation. The downstream density may vary from about 0.05 g./cc. to 0.08 gram per cubic centimeter and preferably from about 0.06 to 0.07 gram per cubic centimeter. Lower densities than this on the downstream side of the filter will not efficiently coalesce the oil, whereas higher densities will reduce the operating time of the filter.

With minute solid particles in the liquid being filtered, it is important that they be removed, as considerable oil is held by these particles, so the filter must not only coalesce the oil but it must filter the solid particles, or at least break the oil away from the solid particles so it is available for coalescing. In order to accomplish this, the pore size of the filter must be in the range from about 10 to 40 microns and preferably from about 15 to 35 microns.

In order to coalesce the oil in the filter having the density as previously described, the velocity of flow of the liquid through the filter must be from about 0.1 to 0.35 feet per minute and preferably from about .10 to .25 feet per minute. Lower velocities will greatly enlarge the amount of filtration area required and make such filtering uneconomical. Higher velocities will not allow for the substantially simultaneously coalescing of the oil and the filtration of solid particles, but will allow the oil to pass through the filter without being attracted sufficiently by the media and growing into larger particles to break the surface tension of the water.

As previously discussed, the preferred configuration of our improved filter and coalescing element is in the form of a cartridge, wherein, the material being filtered enters the center of the cartridge and passes out through the thickness of the filtration and coalescing material and out the outer surface. The importance of this structure is, of course, for practical manufacturing reasons. If a suitable filter batt is made having the desired upstream density, this may readily be wrapped around a metal or other suitable core and by increasing the pressure on each layer wrapped about the core the density may be increased uniformly throughout the thickness of the filter until the last layer has the density desired on the downstream side of the filter.

By constructing the filter as described above with the desired fibers, binder, densities, etc. and by forcing oil-water mixtures through the filter media at the desired velocities you unexpectedly decrease the oil content in an oil-water dispersion to less than 5 parts per million and in most instances to less than about 2 to 3 parts per million. This high degree of purification not only has excellent economical values but also eliminates the water pollution problems encountered in many of the chemical process and manufacturing industries, oil production and refining and various other processes wherein process water containing traces of oil or similar hydrocarbons has to be disposed.

It is obvious that various changes may be made in the form, structure and arrangement of parts without departing from the spirit of the invention. Accordingly, the invention should not be limited to a specific embodiment disclosed herein primarily for purposes of illustration but does include various changes, modifications and alterations which may be made without departing from the spirit and scope of the invention which is only to be limited in accordance with the claims appended hereto.

What is claimed is:

1. A method of removing traces of oil from immiscible liquids comprising passing liquid containing traces of oil through a batt of fibers selected from the class consisting of polyester fibers, acrylic fibers, modacrylic fibers and mixtures of such fibers, said batt being bonded with from about 25 percent to 100 percent by weight of the fibers of a polymer resin selected from the class consisting of polyacrylic resins, polyurethane resins and synthetic rubbers whereby the bonded batt has resilience and resists compression caused by liquid passing therethrough, said bonded batt having a density on the upstream side of from about 0.005 to 0.02 gram per cubic centimeter and on the downstream side of from about 0.05 to 0.08 gram per cubic centimeter and said liquid passing through said bonded batt at a velocity of from about 0.1 to .35 feet per minute, whereby solid particles in said liquid are removed by the bonded batt while simultaneously traces of oil are coalesced and separated from said liquid.

2. The method according to claim 1, wherein, the velocity of the liquid through the bonded batt is from about 0.1 to 0.25 feet per minute.

3. The method according to claim 1, wherein, the liquid containing traces of oil is pre-filtered prior to being passed through said bonded batt of fibers.

4. The method according to claim 1, wherein, the liquid containing traces of oil is passed through a filter of polyester fibers bonded with a polyacrylic resin to prefilter said liquid prior to being passed through said bonded batt of fibers.

5. The method according to claim 4, wherein, the velocity of the liquid through said bonded batt is from about 0.1 to 0.25 feet per minute.

6. An improved media for coalescing and removing oil from immiscible liquids comprising a batt of fibers selected from the class consisting of polyester fibers, acrylic fibers, modacrylic fibers and mixtures of such fibers, said batt being uniformly impregnated with from about 25% to 100% by weight of the fibers of a resin selected from the class consisting of polyacrylic resins, polyurethane resins and synthetic rubbers, whereby, the media is resilient and resists compression caused by liquids being filtered, said media having an upstream density of from about 0.005 to 0.02 gram per cubic centimeter and a downstream density of from about 0.05 to 0.08 gram per cubic centimeter.

7. An improved media according to claim 6, wherein, the fibers are polyester fibers.

8. An improved media according to claim 6, wherein, the batt of fibers is uniformly impregnated with a polyacrylic resin.

9. An improved media according to claim 6 of a batt of polyester fibers uniformly impregnated with a polyacrylic resin.

10. An improved media according to claim 6 having an upstream density of from 0.008 to 0.015 gram per cubic centimeter and a downstream density of from 0.06 to 0.07 gram per cubic centimeter.

11. An improved media according to claim 10 of a batt of polyester fibers uniformly impregnated with a polyacrylic resin.

12. An oil coalescing device comprising a hollow cylindrical porous core open at one end and closed at the opposite end said outer surface of said core being wrapped with a media comprising a batt of fibers selected from the class consisting of polyester fibers, acrylic fibers, modacrylic fibers and mixtures of such fibers, said batt being uniformly impregnated with from about 25 percent to 100 percent by weight of the fibers of a resin selected from the class consisting of polyacrylic resins, polyurethane resins and synthetic rubbers, the density of the media in the area adjacent the outer surface of said core being from about 0.005 to 0.02 gram per cubic centimeter and the density of the media in the area spaced from the outer surface of said core being from about 0.05 to 0.08 gram per cubic centimeter.

13. An oil coalescing device according to claim 12, wherein, the hollow cylindrical core is expanded metal.

14. An oil coalescing device according to claim 12, wherein, the fibers are polyester fibers.

15. An oil coalescing device according to claim 12, wherein, the resin is a polyacrylic resin.

16. An oil coalescing device according to claim 12, wherein, the media is a batt of polyester fibers uniformly impregnated with a polyacrylic resin.

17. An oil coalescing device according to claim 12, wherein, the density of the media uniformly increases from the area adjacent the outer surface of the core to the area spaced from the outer surface of said core.

18. An oil coalescing device according to claim 12, wherein, the wrapped media is enclosed in wire mesh.

19. An oil coalescing device according to claim 12, wherein, the hollow cylindrical core is expanded metal, the media is a batt of polyester fibers uniformly impregnated with a polyacrylic resin, the wrapped media is enclosed in wire mesh and the density of the media uniformly increases from the area adjacent the outer surface of the core to the area adjacent the wire mesh.

References Cited
UNITED STATES PATENTS

| | | |
|---|---|---|
| 3,034,656 | 5/1962 | Kasten. |
| 3,115,459 | 12/1963 | Giesse _____ 210—485 X |
| 3,186,551 | 6/1965 | Dornauf. |
| 3,228,527 | 1/1966 | McPherson _____ 210—307 |
| 3,229,817 | 1/1966 | Pall. |
| 3,256,997 | 6/1966 | Pall et al. _____ 210—23 X |
| 3,347,391 | 10/1967 | Steensen _____ 210—508 X |

REUBEN FRIEDMAN, Primary Examiner.

JOHN ADEE, Assistant Examiner.

U.S. Cl. X.R.

210—73, 318, 491, 508